United States Patent [19]

Koopman

[11] Patent Number: 5,429,042
[45] Date of Patent: Jul. 4, 1995

[54] SPIT FOR ROTISSERIE OVEN

[75] Inventor: Peter J. Koopman, Richmond, Ind.

[73] Assignee: Henny Penny Corporation, Eaton, Ohio

[21] Appl. No.: 293,426

[22] Filed: Aug. 22, 1994

Related U.S. Application Data

[63] Continuation of Ser. No. 978,967, Nov. 23, 1992, abandoned.

[51] Int. Cl.⁶ ............................................. A47J 37/04
[52] U.S. Cl. .............................. 99/421 H; 99/421 R; 99/448
[58] Field of Search ............ 211/181; 99/419, 421 R, 99/421 H, 428, 427, 448, 449

[56] References Cited

U.S. PATENT DOCUMENTS

| | | | |
|---|---|---|---|
| 935,507 | 9/1909 | Hill | 211/181 |
| 1,166,172 | 11/1914 | Turner | 211/181 |
| 1,190,152 | 7/1916 | Gross | 211/181 |
| 3,126,814 | 3/1964 | Brown | 99/421 H |
| 3,527,155 | 9/1970 | Renn | 99/421 H |
| 4,483,241 | 11/1984 | Vaughn | 99/421 H |
| 4,738,192 | 4/1988 | Odom | 99/419 |
| 5,001,971 | 3/1991 | Beller | 99/421 R |
| 5,044,262 | 9/1991 | Burkett | 99/421 R |
| 5,101,715 | 4/1992 | Liu | 99/419 |

FOREIGN PATENT DOCUMENTS

2232876 1/1991 United Kingdom ................ 99/448

Primary Examiner—David A. Scherbel
Assistant Examiner—Terrence R. Till
Attorney, Agent, or Firm—Baker & Botts

[57] ABSTRACT

A spit for a rotisserie oven includes first and second support rods extending within the cooking chamber and a plurality of food carrying devices affixed to the support rods. The food carrying devices include a base having a locking portion depending from one end thereof and a skewer portion depending from the other end thereof. The locking portions and skewers cooperate to individually lock the food product on the spit. Accordingly, food can be removed from the spit without removing the spit from the oven. Moreover, more even cooking is obtained since the outer surface of the food is evenly exposed to the heat source.

38 Claims, 7 Drawing Sheets

SPIT FOR ROTISSERIE OVEN

This application is a continuation of application Ser. No. 07/978,967, filed Nov. 23, 1992, now abandoned.

BACKGROUND OF THE INVENTION

1. Field Of The Invention

This invention is directed to improvements in a food carrying device in ovens, and more particularly, to an improved spit for a rotisserie oven.

2. Background Of The Prior Art

Rotisserie ovens generally include a food carrying device, e.g., a spit or a basket, extending between a rotatable element.

In spits in general, a rod typically extends across, and is mounted within, the cooking chamber. The spit is either mounted directly to the walls of the cooking chamber or mounted to a rotatable element within the cooking chamber. When mounted to the walls of the cooking chamber, the spit itself is rotated by a motor. Accordingly, the spit has a rotary motion within the cooking chamber. Alternatively, when mounted between rotatable elements such as discs, rotational power is imparted to the discs, and the spits follow an orbital path in the cooking chamber.

In either method of mounting, the spit has food arranged along its axial length. For example, processed poultry, which has a cavity at either end (i.e., the head end and the rear end), is mounted on the spit by skewering a plurality of poultry in succession through the cavities until the spit is full. Alternatively, several poultry are skewered in succession through the sides thereof until the spit is full. After the spits are loaded, they are placed in the cooking chamber, and the poultry is cooked. When cooking is completed, the oven enters a HOLD mode in which the food is maintained at a predetermined temperature less than the target cooking temperature. Similar to the loading process, the spit is unloaded by removing the entire spit from the cooking chamber and separating the poultry from the spit in succession. However, when only one poultry product is need for sale or processing, the entire spit must still be removed from the cooking chamber. Thus, in addition to the single poultry product to be removed from the spit, all of the currently unneeded poultry on the spit are also removed from the cooking chamber. After the single poultry product is removed from the spit, the spit with the remaining poultry thereon is returned to the cooking chamber whereupon the HOLD mode of cooking is again resumed. Accordingly, prior art spits, which have a plurality of poultry thereon, require unnecessary handling of the poultry which is not yet needed for sale or processing.

In addressing this concern, some rotisserie ovens employ baskets as opposed to spits for carrying the food. For example, with reference to FIG. 1, there is shown a prior art food carrying device as disclosed in U.S. Pat. No. 4,968,515, which is assigned to the assignee of the present invention and hereby incorporated by reference. According to this design, the food carrying device 50 includes a first rotatable disc 52a and an opposing second rotatable disc 52b. Extending between and mounted on the rotatable discs 52a, 52b are a plurality of baskets 54. Poultry products 56 are aligned within the baskets 54. The baskets are each pivotally mounted on the rotatable discs 52a, 52b at a pivot point 58. As the rotatable discs are rotated, baskets 54 follow an orbital path through the cooking chamber. Since the baskets are pivoted at one point, the baskets 54 are always oriented such that their bottoms 59 are substantially parallel with the bottom of the cooking chamber.

Figure 1:
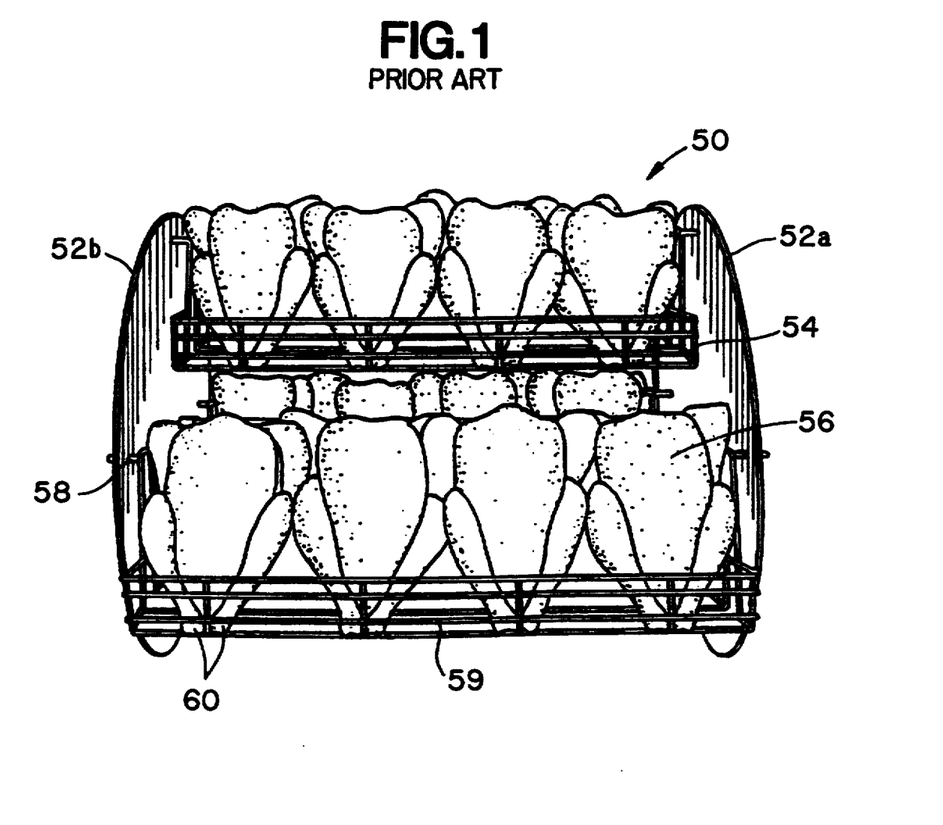
FIG. 1 is a perspective view of a food carrying device according to the prior art.

While baskets 54 permit the poultry to be loaded and unloaded one at a time without removing the respective basket from the cooking chamber, rotisserie ovens employing baskets still suffer from several drawbacks. For example, the heating elements in the cooking chamber are often disposed at the top thereof. The baskets, since pivoted on the rotatable discs 52a, 52b, maintain the poultry in the same relative orientation throughout the orbital revolution, i.e., the bottom of the drumsticks 60 always face downwardly. As a result, the top portion 62 of the poultry is closest to the heating elements, which are typically arranged at the apex of the revolution. The bottom halves of the poultry, on the other hand, have less exposure to the heating elements. Consequently, the poultry is unevenly heated and the top thereof cooks faster than the bottom.

In addition, orbital rotisserie ovens have the incidental benefit of self-basting. In particular, fat and grease from the food product at the upper portions of the rotational path drips on the food product at the lower portions of the rotational path. However, since the baskets pivot, they must be spaced from one another around the periphery of the discs to accommodate the pivotal movement. Otherwise, the baskets would interfere with each other's pivotal movement. In prior art rotisserie ovens employing baskets, e.g., U.S. Pat. No. 4,968,515, the spacing between the baskets creates gaps at the bottom of the rotational path. Accordingly, some of the grease dripping from upper baskets falls in the gaps between adjacent lower baskets. Therefore, some of the juices that might otherwise be used for basting are lost through the gaps.

In order to overcome these and additional disadvantages of prior art spits and baskets used in rotisserie ovens, the spit according to the preferred embodiments has, among other things, a plurality of food carrying devices along the length thereof.

SUMMARY OF THE INVENTION

It is an object of the present invention to provide a spit for a rotisserie oven in which it is unnecessary to remove the spit from the cooking chamber while individual food products are removed and replenished.

It is a further object of the present invention to provide a spit for a rotisserie oven which evenly cooks both the top and bottom half of the food product.

It is a further object of the present invention to provide a spit for a rotisserie oven in which the gaps between the food product are reduced to thereby increase the self-basting effect of the dripping grease and fat.

These and other objects of the present invention are accomplished by providing a spit for a rotisserie oven comprising parallel support members extending between rotatably driven discs. Identical twisted rods are fixedly secured to the parallel support members. The twisted rods include a longitudinal body portion welded to each of the parallel support members. At their bottom ends, the longitudinal body portions are bent 90° to form bights, and the bights are bent to an angle less than 90° to form skewers. At their top ends, the longitudinal body portions are formed into latching or hooking members. The upper ends of the skewers extend beyond the latching members, and when bent backwards, the latching members securely hold the ends of the skewers.

Additionally, the skewers are bent at the point that they contact latching member. The bends in the upper ends of the skewers permit the corresponding skewers, when twisted around one another, to lock in a twisted position.

Processed whole poultry products mounted on the spits according to the preferred embodiments have an open cavity at each end thereof. The corresponding skewers are either squeezed together or twisted, and a whole poultry product, with drumsticks facing downwardly, is mounted on the skewers so that the skewers extend through both cavities thereof. After the poultry product is mounted on the skewers, the bottom end of the drumsticks are tucked inside of bights. Then, the skewers are bent back and locked in place to respective latching members.

When the spits according to the preferred embodiments are removed from the oven, they are placed on a support rack. Accordingly, when loading or unloading the spits, the operator only handles the poultry product without also handling the spits themselves.

The spits according to the preferred embodiments are arranged on the rotatable discs such that the gaps between the food products on adjacent spits is reduced. More particularly, the outer surface of the food is always tangential to the orbital path followed by the spits. Consequently, there is more overlap between the food at the bottom and the food at the top of the orbital path, since no provision for a pivoting food carrying device is required. Therefore, less juices escape through the gaps, and better basting is achieved.

In addition, since the spits according to the preferred embodiment include two rods extending between rotatable discs, the spits will not pivot on the rotatable disc. Instead, the food product on the spits undergoes pure orbital motion, which ensures that the outer portion of the food product will be evenly cooked from top to bottom as it passes by the heating elements disposed, for example, in the top wall of the cooking chamber.

Moreover, since a plurality of individually lockable skewers extend across the width of the cooking chamber, a single poultry product may be removed from the spit without removing the entire spit from the cooking chamber each time a food product it sold.

These and other features and objects of the present invention will become apparent when the specification is read in conjunction with the accompanying drawings.

DETAILED DESCRIPTION OF THE PREFERRED EMBODIMENT

Figure 2:
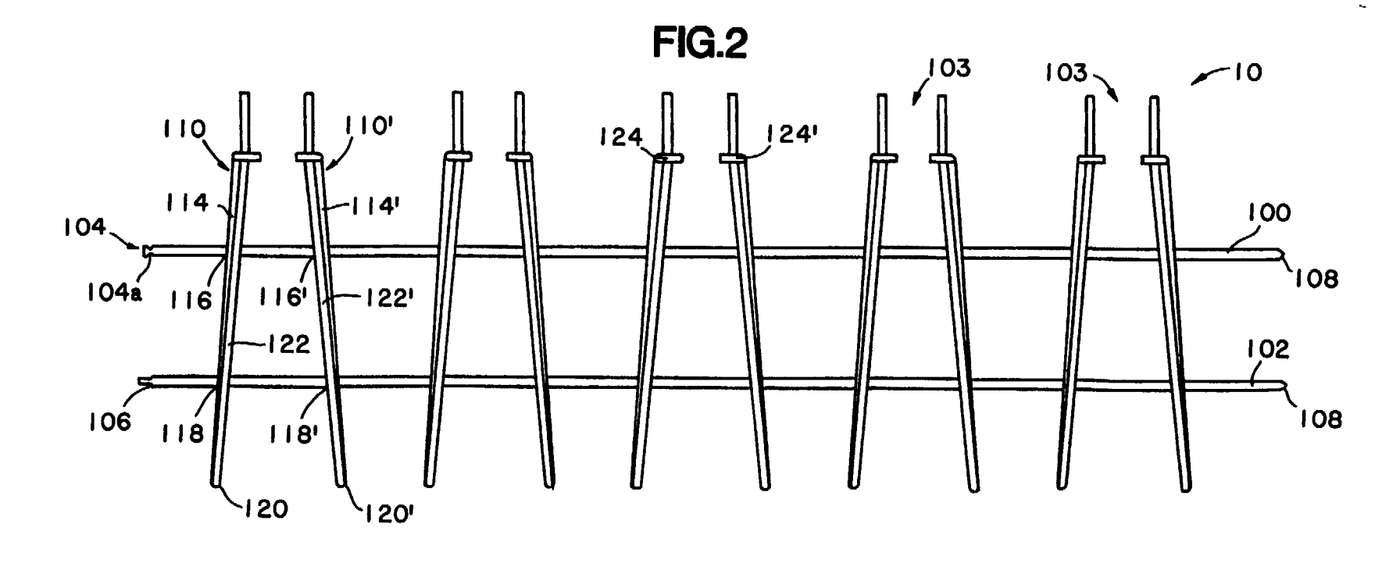
FIG. 2 is a front elevational view of a spit according to the first preferred embodiment.
Figure 3:
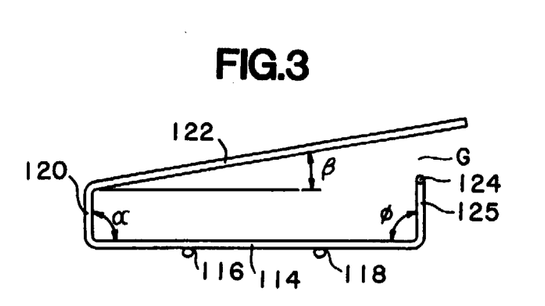
FIG. 3 is a side view of one twisted rod forming a part of the spit of the first embodiment.
Figure 4:
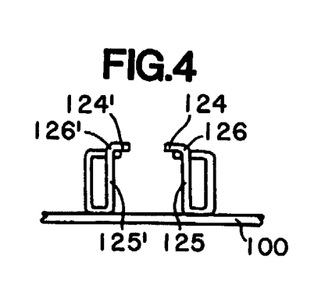
FIG. 4 is a top view of spaced, twisted rods forming a part of the spit of the first embodiment.
Figure 13:
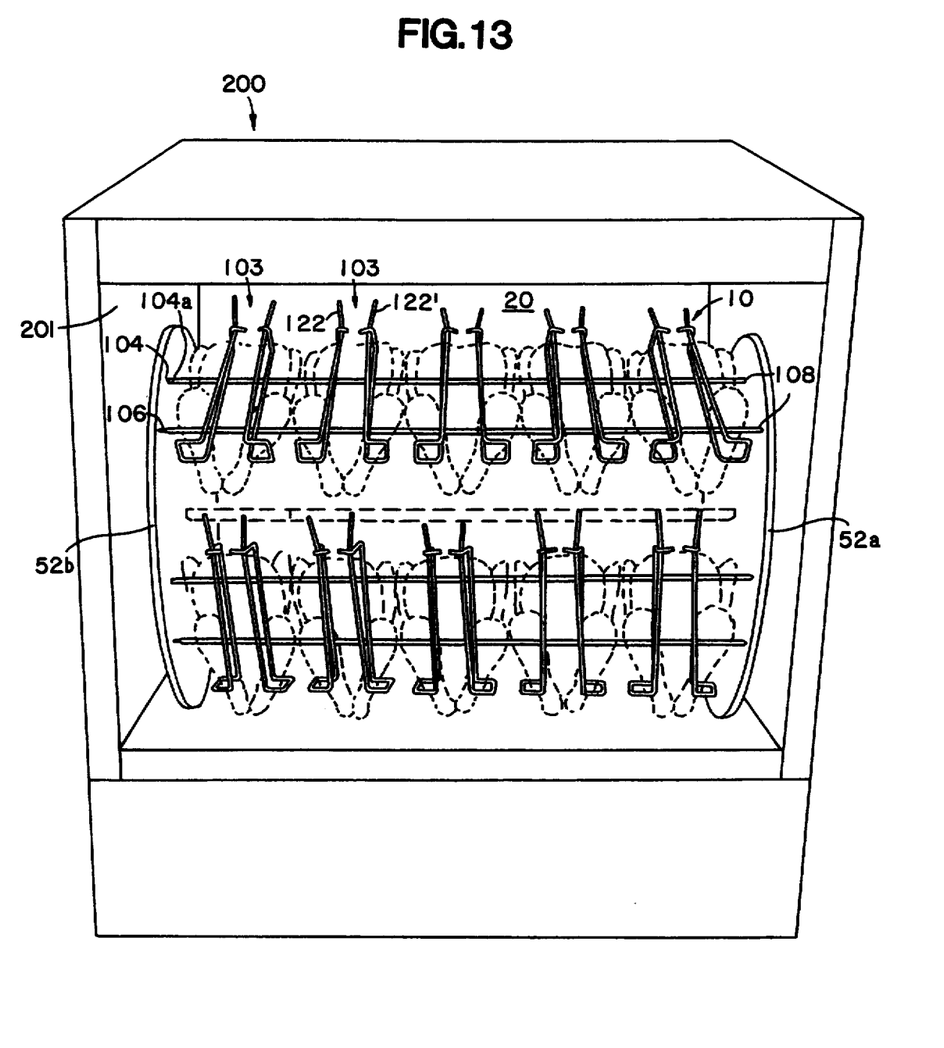
FIG. 13 is a perspective view of spits according to the second embodiment mounted within a cooking chamber of a rotisserie oven.

With reference to FIGS. 2–4, there is shown spit 10 according to a first preferred embodiment. Spit 10 comprises a first rod 100 and a second rod 102 spaced from and generally parallel to the first rod 100. A locking member 104 having a detent portion 104a is provided at one end (left end in FIG. 2) of parallel support rod 100. A reduced diameter portion 106 is also provided at one end (left end in FIG. 2) of parallel support rod 102. The other ends of parallel support rods 100, 102 are tapered at 108. As seen in FIG. 13, the locking member 104, reduced diameter portion 106 and tapered portions 108 are received in corresponding holes in rotatable discs 52a, 52b. The weight of the spit 10 cams the spit such that the discs 52a, 52b are positioned within the detent portion 104a of the locking member 104. When the spit 10 is to be removed from the cooking chamber 20, the operator manipulates spit 10 such that locking member 104 is centered within its corresponding hole in disc 52b. When centered, the operator simply slides the spit 10 towards the other disc 52a until the locking member 104 and reduced diameter portion 106 are free. The tapered portions 108 are then slid out of their corresponding holes and the spit 10 is removed from the cooking chamber 20.

With reference again to FIGS. 2–4, a plurality of food carrying devices 103 are affixed, for example by welding, between and along the length of the first and second rods 100, 102. The food carrying devices include two preferably identical twisted rods 110, 110' bent into a particular configuration. The rods 110, 110' are preferably 1/16-⅜ inch diameter stainless steel. The rods 110, 110' include substantially straight longitudinal bases 114, 114' welded to each of the parallel support rods 100, 102 at 116, 116', 118, 118'. At their bottom ends, the longitudinal bases 114, 114' are bent to an angle α, for example 90°, to form bights 120, 120'. The bights are also bent to an angle β, for example less than 90°, to form skewers 122, 122'. Skewers 122, 122"are aligned with bases 114, 114' in a plane which is substantially perpendicular with the plane of the parallel support rods 100, 102.

At their top ends, the bases 114, 114' are bent inwardly from the plane of support rods 100, 102 to an angle φ, for example 90°, to form top planar portions 125, 125'. Top planar portions 125, 125' are bent at 126, 126' to form latching or hooking members 124, 124' which preferably extend generally parallel to support rods 100, 102. The upper ends of the skewers 122, 122' extend beyond the latching members 124, 124'. Since skewers 122, 122' depend from bights 120, 120' at an angle β which is preferably less than 90°, there is a gap G (FIG. 3) between the end of the skewers 122, 122' and the latching members 124, 124'. Accordingly, skewers 122, 122', when bent backwards towards latching members 124, 124', are tensed such that the latching members 124, 124' securely hold the end of the skewers 122, 122'. The first half of food carrying device 110 comprising base 114, bight 120, skewer 122 and latching member 124 is essentially a releasable spring. Similarly, the second half of food carrying device 110' is essentially a releasable spring. It is within the purview of the preferred embodiment to eliminate bights 120, 120' altogether and simply have skewers 122, 122' depend from bases 114, 114' at an angle $\beta$ which is less than 90°.

Figure 5:
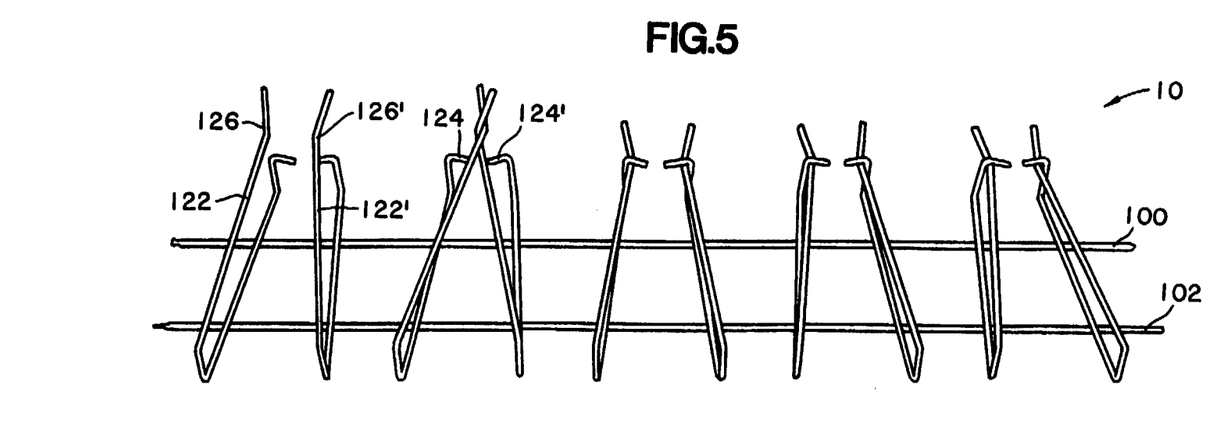
FIG. 5 is a perspective view of the spit of the first embodiment.

Additionally, with reference to FIG. 5, the skewers have bends 126, 126' which lock the skewers 122, 122' together when the skewers are twisted around one another. This allows food to be easily removed and replaced on the skewers. In particular, before food is loaded onto or removed from the skewers 122, 122', the skewers are unhooked from latches 124, 124' and twisted around one another. Food is then inserted on or removed from the twisted, unlocked skewers 122, 122'. Moreover, bends 126, 126', which engage latching members 124, 124', afford a more secure latching mechanism.

Figure 7:
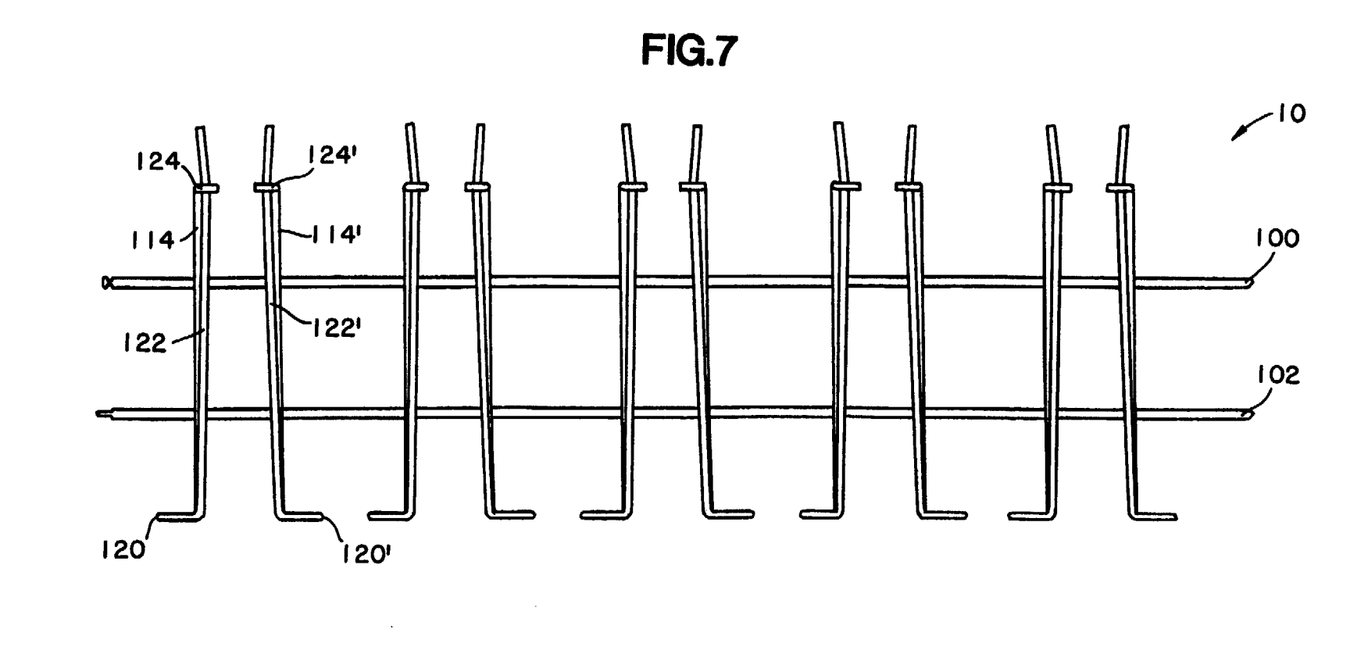
FIG. 7 is a front elevational view of a spit according to the second preferred embodiment.

As seen in FIG. 2, base 114 and base 114' are mounted on parallel support rods 100, 102 such that they converge in the direction of latching members 124, 124'. Accordingly, the food carrying devices 103 are wider at the bight ends 120, 120' thereof. Alternatively, bases 114, 114' can be arranged on parallel support rods 100, 102 such that they are parallel to one another as shown by the bases 114, 114' in the second preferred embodiment (FIG. 7). Moreover, while the food carrying devices 103 have been described in connection with two twisted rods 110, 110', it is within the purview of the present invention to fashion the food carrying devices from only one of the twisted rods 110 or 110'. As with two twisted rods 110, 110', a food carrying device with only one twisted rod 110 or 110' still allows food to be individually removed from or placed on the food carrying device 110 or 110' without having to remove the spit 10 from the cooking chamber.

Figure 6:
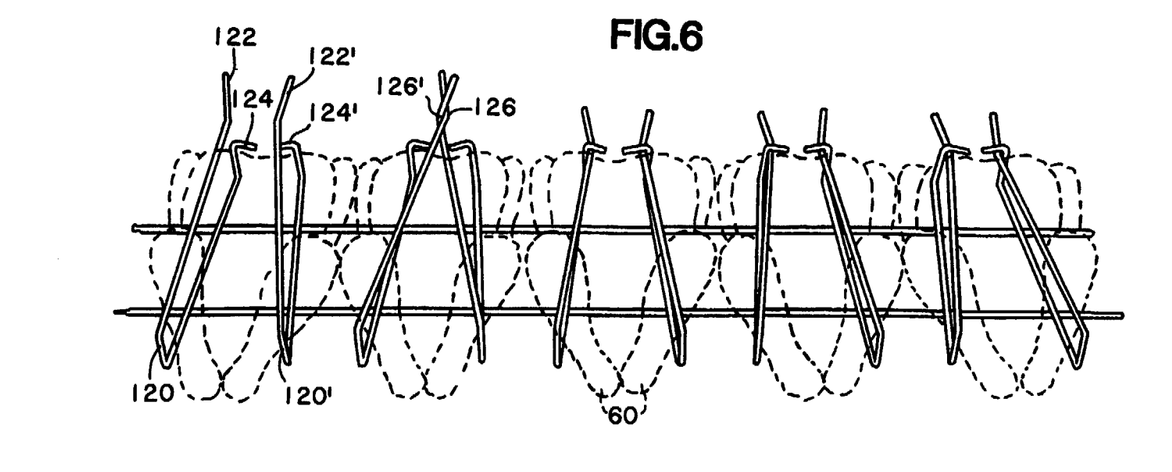
FIG. 6 is a perspective view of the spit of the first embodiment with poultry mounted thereon.

Processed poultry typically has cavities at either end thereof. With reference to FIG. 6, with the skewers 122, 122' twisted and locked about bends 126, 126', a whole poultry product is mounted, preferably with drumsticks 60 facing downwardly, so that both of the skewers 122, 122' extend through both cavities of the poultry. Then, the drumsticks 60 are tucked inside of bights 120, 120', and the skewers 122, 122' are untwisted and locked to latching members 124, 124'. With the drumsticks 60 tucked inside of bights 120, 120', a neater and more pleasing appearance is obtained than if the drumsticks 60 were not so secured. Alternatively, if no bends 126, 126' are provided, skewers 122, 122' are pinched to bring their ends together. Accordingly, with the skewers 122, 122' pinched together, the poultry is inserted thereon through the cavities.

Figure 8:
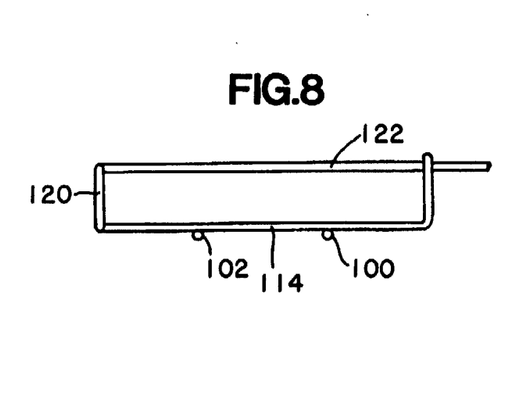
FIG. 8 is a side view of one twisted rod forming a part of the spit of the second embodiment.
Figure 9:
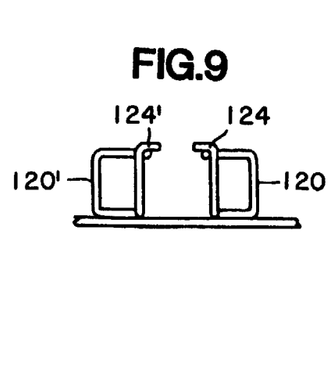
FIG. 9 is a top view of spaced, twisted rods forming a part of the spit of the second embodiment.

A spit 10 according to the second preferred embodiment is shown in FIGS. 7-9. For convenience, similar elements are designated with similar reference numerals with the discussion primarily reserved for those features that differ between the first embodiment. The spit 10 according to the second preferred embodiment includes a base 114, 114' affixed to parallel support rods 100, 102. A bight portion 120, 120' extends from the lower end of the base 114, 114' and a latching member 124, 124' extends from the upper end of base 114, 114'. A skewer 122, 122' depends from the bight portion 120, 120'.

Figure 10:
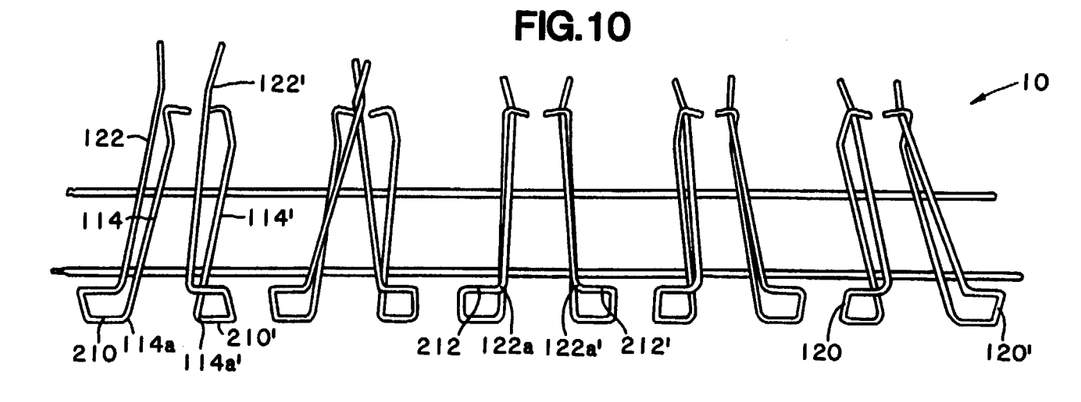
FIG. 10 is a perspective view of the spit of the second embodiment.
Figure 11:
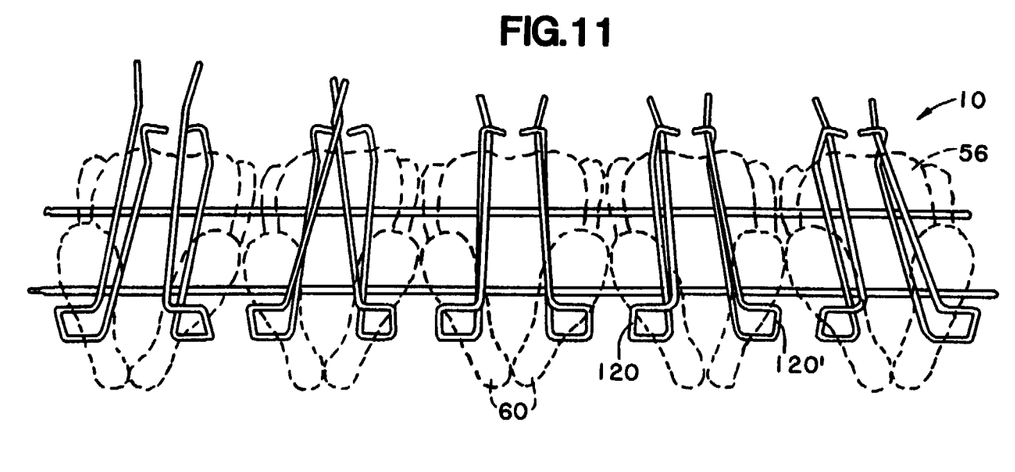
FIG. 11 is a perspective view of the spit of the second embodiment with poultry mounted thereon.

With reference to FIGS. 10 and 11, the bight portion 120, 120' according to the second embodiment, in contrast with the first embodiment thereof, is offset from the plane of the base 114, 114' and skewer 122, 122'. More particularly, at its bottom end, the bases 114, 114' are bent at 114a, 114a' to form a first leg 210, 210' preferably extending perpendicularly to the plane of the skewers 122, 122' and bases 114, 114'. Also, at its bottom, the skewers 122, 122' are bent at 122a, 122a' to form a second leg 212, 212' preferably extending perpendicularly to the plane of the skewers 122, 122' and bases 114, 114'. Between the first legs 210, 210' and second legs 212, 212' is an offset bight 120, 120'. The bight 120, 120' forms a stirrup into which the bottom ends of the drumsticks 60 are tucked when the poultry 56 is mounted on the spit 10. With the drumsticks 60 tucked inside of the bight 120, 120', a neater and more pleasing appearance is obtained than if the drumsticks 60 were not so secured.

Figure 12:
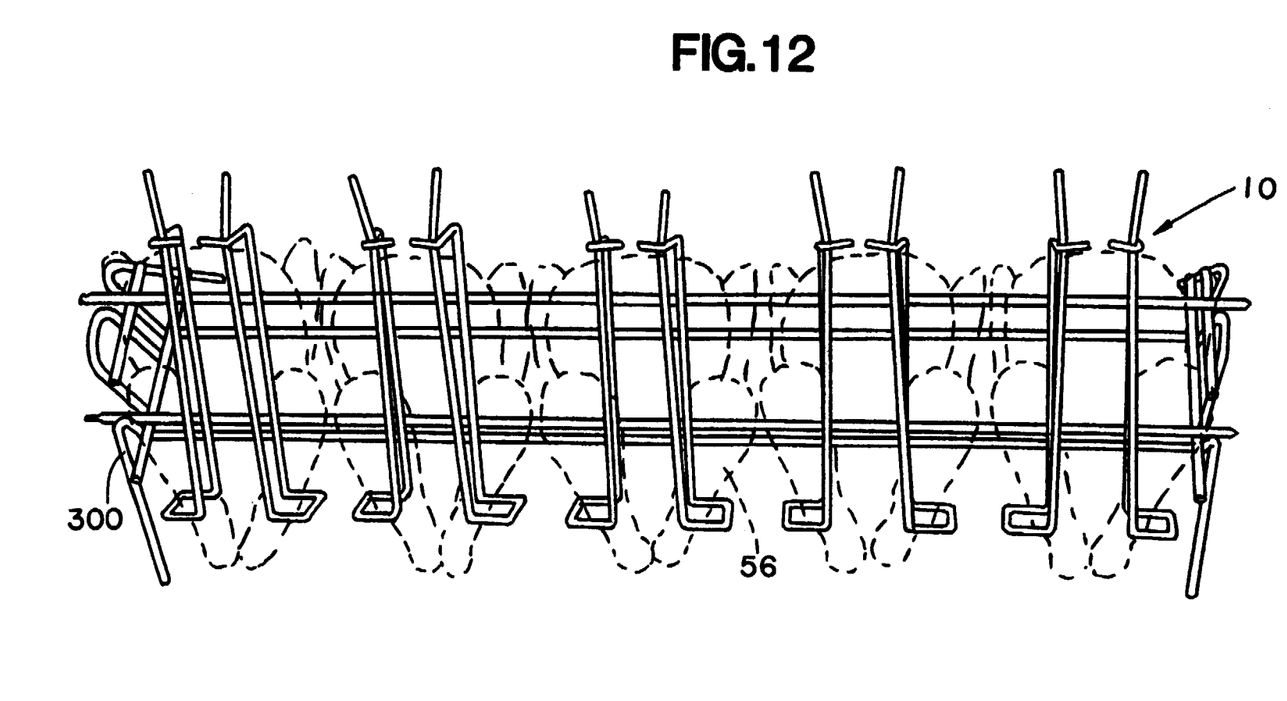
FIG. 12 is a perspective view of the spit of the second embodiment mounted on a mounting rack.

With reference to FIG. 12, there is shown a spit 10 according to the second preferred embodiment supported on a rack 300 after being removed from the cooking chamber. Since the spit 10 rests on rack 300 when not in the cooking chamber, the operator, when removing or replenishing the spit 10 with food, simply handles the poultry 56 without concerning themselves with also positioning the spit 10. Accordingly, rack 300 facilitates the removal and replenishment of the poultry product when the spit 10 is removed from the cooking chamber.

In FIG. 13, there is shown a spit 10 mounted between discs 52a, 52b in a cooking chamber 20 of a rotisserie oven. The spit 10 is mounted on discs 52a, 52b such that the outer surface of the poultry remains substantially tangential to the outer surface of discs during the orbital motion. Since the spits 10 are attached to discs at four points 104, 106, 108 and 108 through rods 100, 102, the spits 10 do not pivot as discs 52a, 52b rotate. Accordingly, the poultry does not pivot either. With the outer surface of the poultry arranged substantially tangential to the discs 52a, 52b, the poultry will be evenly cooked as it passes the heating elements disposed, for example, in the top wall of the cooking chamber. Moreover, since the spits 10 do not pivot, they can be aligned closer to one another on discs 52a, 52b. Stated otherwise, if the spits 10 pivoted on the discs 52a, 52b, the spacing between the spits 10 would have to be increased to accommodate the pivotal motion. Consequently, not only can more poultry be accommodated around discs 52a, 52b, the self-basting effect has been improved over basket type food carrying devices since the gap between adjacent food carrying devices has been reduced. Thus, less dripping fat will be lost through the gaps between adjacent spits, and the basting is improved.

While the preferred embodiments of the spit have been described in connection with supporting poultry products, it is also within the scope of the preferred embodiments to support, in addition to poultry, such as chicken, turkey and duck, other food products such as ribs, roast beefs, brochettes or whole fish, just to name a few alternative foods. When cooking any of the latter-mentioned food products, the food carrying device 103 would be fashioned from a plurality of single twisted rods 110 or 110' instead of pairs of twisted rods. In this arrangement, a single skewer 122 or 122' would pierce the food and then engage a latching member 124 or 124'. Accordingly, individual food products could still be individually removed from or placed on the food carrying device 103 without having to remove the spit 10 from the cooking chamber.

The present invention has been described with reference to the preferred embodiments. These embodiments, however, are merely for example only and the present invention is not intended to be restricted thereto. It will be understood by those skilled in the art that variations and modifications can be easily made within the scope of the present invention as defined by the appended claims.

I claim:

1. A spit for carrying food in a cooking chamber of a rotisserie oven, said spit comprising:
   at least a first rod having an axis and extending within the cooking chamber; and
   a plurality of food carrying means connected to said first rod and spaced apart along the axis of said first rod for carrying food within the cooking chamber, at least one of said plurality of food carrying means comprising:
      at least a first base, having at least two ends, attached to said first rod;
      at least a first skewer depending from one of said at least two ends of said first base, said first skewer penetrating the food;
      at least a first latch depending from another of said at least two ends of said first base, wherein said first skewer and said first latch cooperate to lock the food on said at least one of said plurality of food carrying means;
      a second base, having at least two ends, spaced from said first base and attached to said first rod;
      a second skewer depending from one of said at least two ends of said second base; and
      a second latch depending from another of said at least two ends of said second base, said second skewer and said second latch cooperating with said first skewer and said first latch to lock the food on said at least one of said plurality of food carrying means.

2. The spit of claim 1, said first base, said first skewer and said first latch comprise a twisted rod.

3. A spit for carrying food in a cooking chamber of a rotisserie oven, said spit comprising:
   at least a first rod having an axis and extending within the cooking chamber;
   a plurality of food carrying means connected to said first rod and spaced apart along the axis of said first rod for carrying food within the cooking chamber, at least one of said plurality of food carrying means comprising:
      at least a first base, having at least two ends, attached to said first rod;
      at least a first skewer depending from one of said at least two ends of said first base, said first skewer penetrating the food; and
      at least a first latch depending from another of said at least two ends of said first base, wherein said first skewer and said first latch cooperate to lock the food on said at least one of said plurality of food carrying means; and
   a second rod spaced from said first rod and extending within the cooking chamber, at least one of said plurality of food carrying means operatively connecting said first and second rods.

4. The spit of claim 3, said first base integrally connected to both said first rod and said second rod.

5. The spit of claim 1 further comprising a second rod spaced from said first rod and extending within the cooking chamber, at least one of said plurality of food carrying means operatively connecting said first and second rods.

6. The spit of claim 5, said first base and said second base integrally connected to both said first rod and said second rod.

7. The spit of claim 1 further comprising a first bight between said first base and said first skewer and a second bight between said second base and said second skewer.

8. The spit of claim 7, said first bight in substantially the same plane as said first base and said first skewer, said second bight in substantially the same plane as said second base and said second skewer, and wherein in said first bight is integrally formed between said first base and said first skewer and said second bight is integrally formed between said second base and said second skewer.

9. The spit of claim 7, said first bight offset from the plane of said first base and said first skewer, said second bight offset from the plane of said second base and said second skewer, and wherein said first bight is integrally formed between said first base and said first skewer and said second bight is integrally formed between said second base and said second skewer.

10. The spit according to claim 1 further comprising locking means on said first and second skewers for locking said skewers together to facilitate loading and unloading the food.

11. The spit according to claim 10, said locking means comprising a bent portion in each of said first and second skewers for locking said skewers together when twisted around one another.

12. The spit according to claim 11, said bent portion of said first skewer cooperating with said first latch and said bent portion of said second skewer cooperating with said second latch.

13. The spit of claim 1 further comprising a first bight between said first base and said first skewer.

14. The spit of claim 13, said first bight in substantially the same plane as said first base and said first skewer, and wherein said first bight is integrally formed between said first base and said first skewer.

15. A spit for carrying food in a cooking chamber of a rotisserie oven, said spit comprising:
   at least a first rod having an axis and extending within the cooking chamber; and
   a plurality of food carrying means connected to said first rod and spaced apart along the axis of said first rod for carrying food within the cooking chamber, at least one of said plurality of food carrying means comprising:
      at least a first base, having at least two ends, attached to said first rod;
      at least a first skewer depending from one of said at least two ends of said first base, said first skewer penetrating the food;
      at least a first latch depending from another of said at least two ends of said first base, wherein said first skewer and said first latch cooperate to lock the food on said at least one of said plurality of food carrying means; and
      at least a first bight offset from the plane of said first base and said first skewer and integrally formed between said first base and said first skewer.

16. A spit for carrying food in a cooking chamber of a rotisserie oven, said spit comprising:

at least a first rod having an axis and extending within the cooking chamber;

a first skewer means, depending from said first rod, for skewering and holding a first food product in the cooking chamber;

a second skewer means, spaced from said first skewer means along the axis of said first rod and depending from said first rod, for skewering and holding a second food product in the cooking chamber;

a first base and a first latch depending from said first rod, said first latch and said first skewer means integral with said first base and cooperating to lock the first food product on the spit; and a second base and a second latch depending from said first rod, said second latch and said second skewer means integral with said second base and cooperating to lock the second food product on the spit.

17. The spit of claim 16, further comprising a second rod spaced from said first rod and extending within the cooking chamber, at least one of said skewer means connecting said first and second rods.

18. A spit for holding a food product in a cooking chamber of a rotisserie oven having at least one support member for supporting said spit during orbital motion of said spit within said rotisserie oven, said spit comprising:

a rod having an axis and extending at least partially within the cooking chamber;

a plurality of skewer means, spaced apart along the axis of said rod and depending from said rod, for skewering a plurality of food products, said skewer means permitting selective removal of a single food product therefrom while said spit with the remainder of the plurality of food products remains within the cooking chamber; and pivot prevention means for preventing pivotal motion of said spit during orbital motion thereof within said rotisserie oven.

19. A spit for carrying food in a cooking chamber of a rotisserie oven having at least one support member for supporting said spit during orbital motion of said spit within said rotisserie oven, said spit comprising:

at least a first rod having an axis and extending within the cooking chamber; and at least one food carrying means connected to said first rod for carrying food within the cooking chamber, said at least one food carrying means comprising:

at least a first base, having at least two ends, attached to said first rod;

at least a first skewer depending from one of said at least two ends of said first base, said first skewer penetrating the food; and at least a first latch depending from another of said at least two ends of said first base, wherein said first skewer and said first latch cooperate to lock the food on said at least one food carrying means, said first skewer angularly offset from the axis of said first rod; and pivot prevention means for preventing pivotal motion of said spit during orbital motion thereof within said rotisserie oven.

20. The spit of claim 19, wherein said first base, said first skewer and said first latch comprise a twisted rod.

21. The spit of claim 18, said pivot prevention means comprising a second rod spaced from said first rod and extending within the cooking chamber, said at least one food carrying means operatively connecting said first and second rods.

22. The spit of claim 21, said first base integrally connected to both said first rod and said second rod.

23. The spit of claim 19, said at least one food carrying means further comprising a second base, having at least two ends, spaced from said first base and attached to said first rod, a second skewer depending from one of said at least two ends of said second base and a second latch depending from another of said at least two ends of said second base, said second skewer and said second latch cooperating with said first skewer and said first latch to lock the food on said at least one food carrying means.

24. The spit of claim 23, said pivot prevention means comprising a second rod spaced from said first rod and extending within the cooking chamber, said least one food carrying means operatively connecting said first and second rods.

25. The spit of claim 24, said first base and said second base integrally connected to both said first rod and said second rod.

26. The spit of claim 23 further comprising a first bight integrally formed between said first base and said first skewer; and a second bight integrally formed between said second base and said second skewer.

27. The spit of claim 26, said first bight in substantially the same plane as said first base and said first skewer, said second bight in substantially the same plane as said second base and said second skewer.

28. The spit of claim 26, said first bight offset from the plane of said first base and said first skewer, said second bight offset from the plane of said second base and said second skewer.

29. The spit of claim 23 further comprising a plurality of food carrying means.

30. The spit of claim 23 further comprising locking means on said first and second skewers for locking said first and second skewers together to facilitate loading and unloading the food.

31. The spit of claim 30, said locking means comprising a bent portion in each of said first and second skewers for locking said first and second skewers together when twisted around one another.

32. The spit of claim 31, said bent portion of said first skewer cooperating with said first latch and said bent portion of said second skewer cooperating with said second latch.

33. The spit of claim 19 further comprising a first bight integrally formed between said first base and said first skewer.

34. The spit of claim 33, said first bight in substantially the same plane as said first base and said first skewer.

35. The spit of claim 33, said first bight offset from the plane of said first base and said first skewer.

36. The spit of claim 19 further comprising a plurality of food carrying means.

37. A rotisserie oven comprising:

a cooking chamber;

at least a first support member rotatably supported in said cooking chamber and having an outer peripheral surface;

at least a first rod having an axis and connected adjacent said outer peripheral surface of said first support member;

a driving mechanism, said driving mechanism drivingly coupled to said first support member for rotating said first support member within said cooking chamber;

a first skewer, connected to said first rod, upon which a first food product may be held in the cooking chamber;

a second skewer, spaced from said first skewer along the axis of said first rod and connected to said first rod, upon which a second food product may be held in the cooking chamber;

means for maintaining at least one of said food products substantially tangential to the outer peripheral surface of said support member while said driving mechanism rotates said first support member; and at least a first base and a first latch connected to said first rod, said first latch and said first skewer integral with said first base and cooperating to lock the first food product on the spit.

38. A rotisserie oven comprising:

a cooking chamber;

at least a first support member rotatably supported in said cooking chamber;

at least a first rod having an axis and connected to said first support member;

a driving mechanism, said driving mechanism drivingly coupled to said first support member for rotating said first support member within said cooking chamber;

a first skewer, connected to said first rod, upon which a first food product may be held in the cooking chamber;

a second skewer, spaced from said first skewer along the axis of said first rod and connected to said first rod, upon which a second food product may be held in the cooking chamber;

a first base and a first latch connected to said first rod, said first latch and said first skewer integral with said first base and cooperating to lock the first food product on the spit; and a second base and a second latch connected to said first rod, said second latch and said second skewer integral with said second base and cooperating to lock the second food product on the spit.

* * * * *